(12) United States Patent
Song

(10) Patent No.: US 9,184,659 B2
(45) Date of Patent: Nov. 10, 2015

(54) SELF-ADAPTIVE CURRENT-MODE-CONTROL CIRCUIT FOR A SWITCHING REGULATOR

(75) Inventor: AnFei Song, Shanghai (CN)

(73) Assignee: INTEGRATED DEVICE TECHNOLOGY, inc., San Jose, CA (US)

( * ) Notice: Subject to any disclaimer, the term of this patent is extended or adjusted under 35 U.S.C. 154(b) by 430 days.

(21) Appl. No.: 12/944,976

(22) Filed: Nov. 12, 2010

(65) Prior Publication Data

US 2012/0119718 A1 May 17, 2012

(51) Int. Cl.
| | |
|---|---|
| *H02M 3/156* | (2006.01) |
| *H02M 3/158* | (2006.01) |
| *G05F 1/10* | (2006.01) |
| *H02M 1/00* | (2007.01) |

(52) U.S. Cl.
CPC .............. *H02M 3/1588* (2013.01); *G05F 1/10* (2013.01); *H02M 3/156* (2013.01); *H02M 2001/0009* (2013.01); *H02M 2001/0025* (2013.01)

(58) Field of Classification Search
CPC .............. H02M 3/156; H02M 3/1588; Y02B 70/1466; G05F 1/10; G05F 1/00; G05F 1/565
USPC .......................................... 323/282, 284, 285
See application file for complete search history.

(56) References Cited

U.S. PATENT DOCUMENTS

| | | | | |
|---|---|---|---|---|
| 6,308,554 | B1* | 10/2001 | Mattes et al. | 73/1.37 |
| 2006/0113969 | A1* | 6/2006 | Hatanaka | 323/212 |
| 2007/0182392 | A1* | 8/2007 | Nishida | 323/282 |
| 2007/0296389 | A1* | 12/2007 | Chen et al. | 323/290 |
| 2008/0150508 | A1* | 6/2008 | Sohma | 323/283 |
| 2009/0322299 | A1* | 12/2009 | Michishita et al. | 323/282 |
| 2010/0066333 | A1* | 3/2010 | Noda | 323/282 |

OTHER PUBLICATIONS

IEEE, IEEE 100 the Authoritative Dictionary of IEEE Standards, 2000, Seventh Edition, pp. 246-247, Digital Object Identifier:10.1109/IEEESTD.2000.322234.*

* cited by examiner

*Primary Examiner* — Fred E Finch, III
*Assistant Examiner* — Gustavo Rosario Benitez
(74) *Attorney, Agent, or Firm* — Hayes & Boone LLP

(57) ABSTRACT

A current-mode-control circuit for a switching regulator is provided. The circuit includes a first transistor coupled to a power supply voltage, a second transistor, and an inductor. The circuit further includes a slope compensation generation circuit coupled to the output of the current control circuit through a feedback loop, the slope compensation generation circuit generating a slope compensation current related to the output voltage, an inductor current sensing circuit coupled to the first transistor and the second transistor, and configured to calculate a current through the inductor and output a inductor sense current, and a pulse-width modulation control circuit coupled to the slope generation circuit and the inductor current sense circuit, the pulse-width modulation control circuit receiving the output of the current control circuit, the slope compensation current and the inductor sense current as inputs.

17 Claims, 10 Drawing Sheets

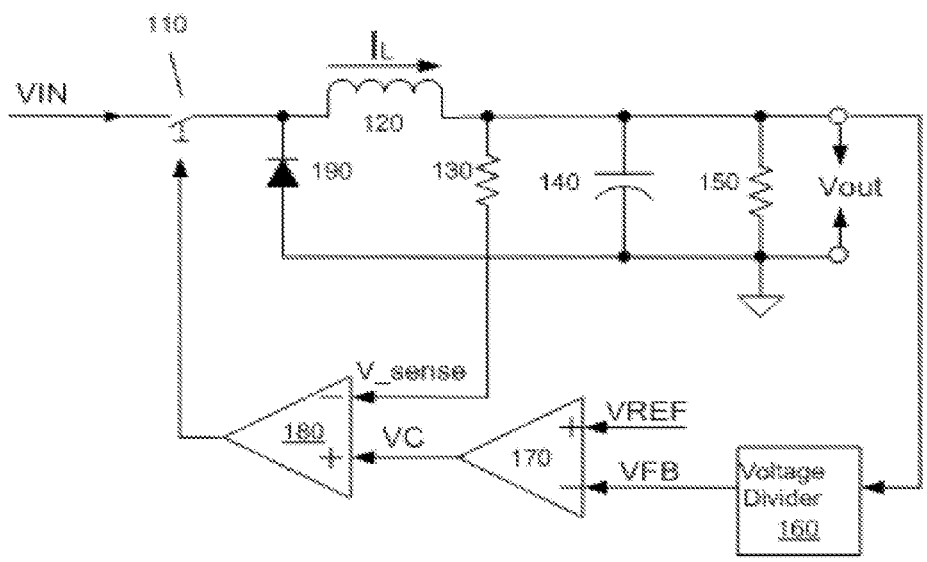
FIG. 1 – PRIOR ART

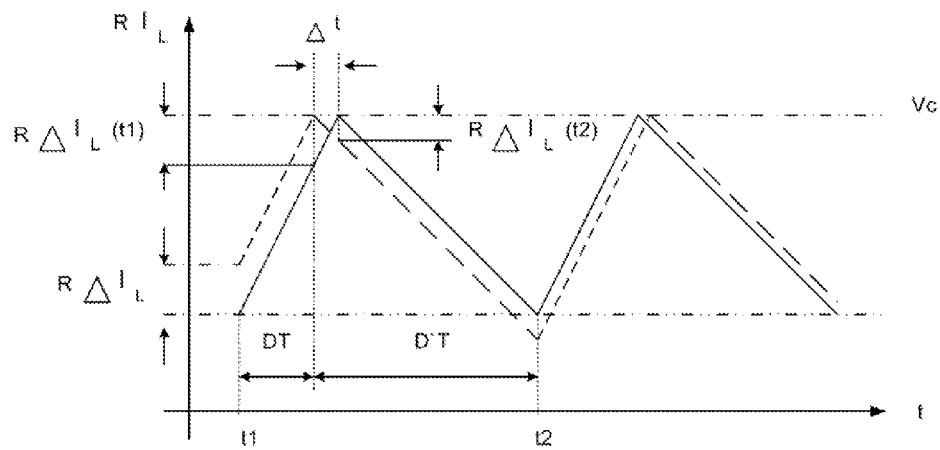
FIG. 2A – PRIOR ART
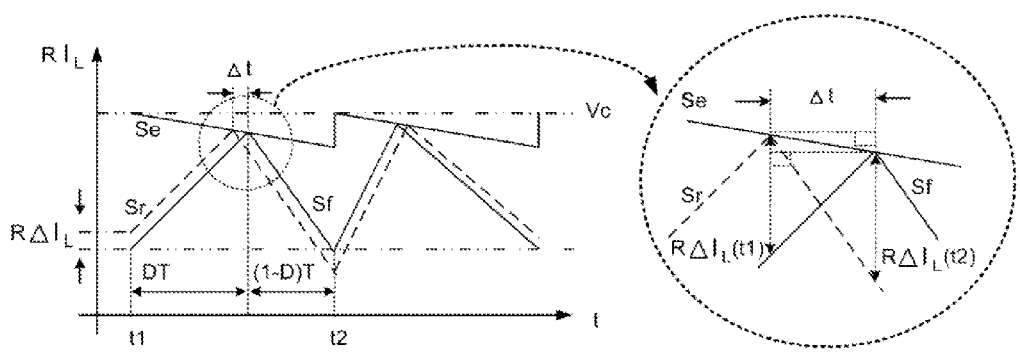
FIG. 2B – PRIOR ART

INDUCTOR CURRENT SENSE CIRCUIT

700
Figure 7A
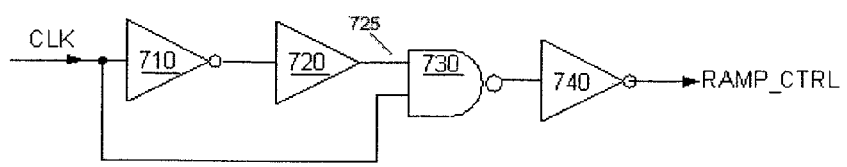
Figure 7B
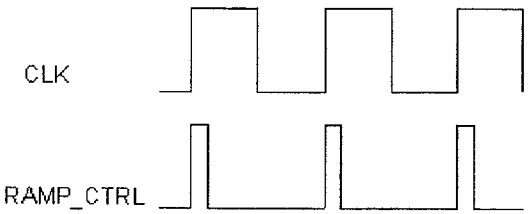
Figure 7C
FIG. 7

SELF-ADAPTIVE CURRENT-MODE-CONTROL CIRCUIT FOR A SWITCHING REGULATOR

TECHNICAL FIELD

The present disclosure relates to a system and a method of controlling power electronic circuitry, in particular, to an active switching voltage regulator in power supplies.

DISCUSSION OF RELATED ART

Voltage regulators are used to automatically maintain a constant voltage level. Most active modern electronic voltage regulators typically operate by comparing the actual output voltage to some internal fixed reference voltage. Any difference between the actual output voltage and the internal fixed reference voltage is amplified and used to control a regulation element in such a way as to reduce the difference. Typical regulators include active regulators such as linear, switching, silicon controlled rectifier (SCR) regulators, electromechanical regulators, and coil-rotation AC voltage regulators.

Active regulators, including linear and switching regulators, are named as such because they use at least one active component such as a transistor or operational amplifier. Linear regulators are termed as such because they are based on devices, such as resistors, transistors and operational amplifiers that operate in a linear region. A linear regulator maintains the desired output voltage by dissipating excess power in ohmic losses, such as in the form of heat. Based on this principle of operation, a linear regulator has a maximum power efficiency that is equal to the ratio of voltage-out/voltage-in.

A switching regulator, on the other hand, regulates either output voltage or current by rapidly switching a device on and off. For example, some switching regulators utilize capacitors and inductors which are switched into and out of different electrical configurations. The principle is that, because the switched devices have no resistance when "closed" and carry no current when "open", the converters can theoretically operate with all input power delivered to the load, i.e. 100% efficiency. Switching regulators offer advantages over the previously-discussed linear regulators as they are able to generate output voltages which are higher than or of opposite polarity from the input voltage. Additional advantages of switching regulators include higher efficiency, smaller size, and lighter weight. Therefore, switching regulators have found broad applications in chargers for personal computers, laptops, and mobile devices.

However, despite the given advantages over linear regulators, switching regulators commonly have disadvantages such as greater complexity, the generation of high-amplitude and high-frequency energy, and ripple voltage noises at the switching frequency and its harmonic frequencies. Because of the harmonic noises and the high-amplitude and high-frequency energy generation, switching regulators often require a filter, such as a low pass filter, to clean the output, which adds additional complexity to the regulator. In addition, current-mode controlled switching regulators experience sub-harmonic oscillations at certain duty ratios which further hinder their stability. Therefore, it is desirable to design low noise and highly accurate switching regulators.

SUMMARY

In accordance with some embodiments, a current-mode-control circuit for a switching regulator is provided. The circuit includes a first transistor coupled to a power supply voltage and to a first node, a second transistor coupled to the first node, an inductor coupled between the first node and an output of the current mode control circuit, and a slope compensation generation circuit coupled to the output of the current control circuit through a feedback loop. The slope compensation generation circuit generates a slope compensation current related to the output voltage, and the circuit further includes an inductor current sensing circuit coupled to the first transistor and the second transistor, and configured to calculate a current through the inductor and output a inductor sense current, and a pulse-width modulation control circuit coupled to the slope generation circuit and the inductor current sense circuit, the pulse-width modulation control circuit receiving the output of the current control circuit, the slope compensation current and the inductor sense current as inputs.

A method for controlling a switching regulator is also provided. The method includes receiving, by a slope compensation circuit, a voltage proportional to an output voltage of the switching regulator, generating, by the slope compensation circuit, a slope compensation current, transmitting the slope compensation current from the slope compensation circuit to a pulse width modulation control circuit, comparing, by a comparator in the pulse width modulation control circuit, a voltage proportional to the slope compensation current and a reference voltage and storing a comparison result, and generating, by the pulse width modulation control circuit, at least one switching control signal based on the comparison result.

BRIEF DESCRIPTION OF THE DRAWINGS

Some embodiments will be described more fully below with reference to the accompanying drawings. The disclosed embodiments may be embodied in many different forms and should not be construed as being limited to the embodiments set forth herein.

FIG. 1 shows a block diagram of a basic switching regulator.

FIGS. 2A and 2B illustrate a voltage waveform as a function of time of an inductor in a basic switching regulator;

FIG. 7A-7C illustrate an example of a generation circuit for a ramp control signal;

DETAILED DESCRIPTION

Figure 3:
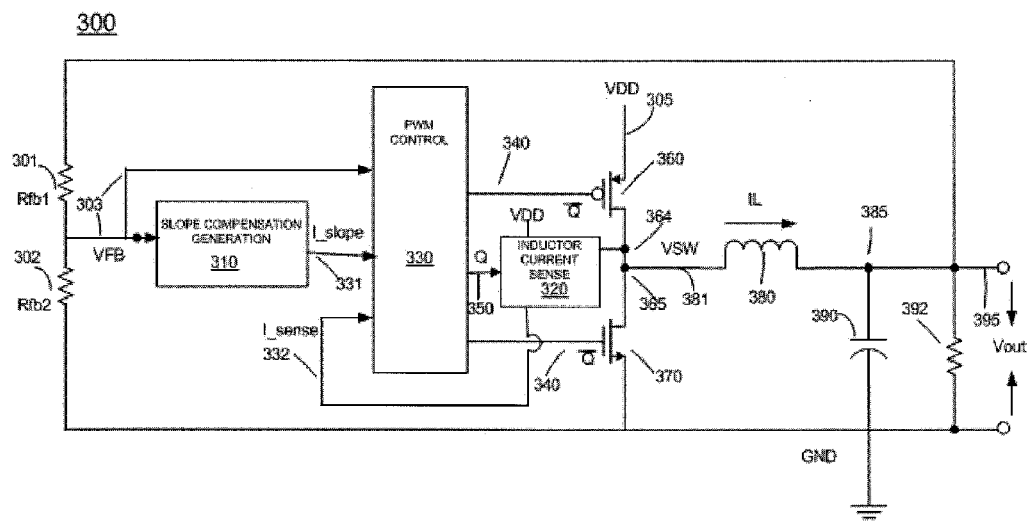
FIG. 3 illustrates a system of a switching regulator with the artificial slope compensation.

In the following description, specific details are set forth describing embodiments of the present disclosure. It will be apparent, however, to one skilled in the art that some embodiments may be practiced without some or all of these specific details. The specific embodiments disclosed herein are meant to be illustrative but not limiting. One skilled in the art may realize other material that, although not specifically described here, is within the scope and the spirit of this disclosure.

Switching regulators typically have two control modes: a voltage-control mode and a current-control mode. The voltage-control mode often requires an LC filter that adds conjugate poles, resulting in a difficult control loop design and a slower transient response. However, the current-control mode uses an extra current control loop alongside a voltage control loop. This current control loop senses the inductor current and changes the two conjugate poles into one pole in a low frequency field. As a result, the phase margin is improved and the compensation design becomes easier. FIG. 1 is a diagram of a basic switching regulator. A switching regulator 100 converts an input voltage VIN into a stable output voltage Vout. In the switching regulator 100, a switch 110 receives an input voltage VIN. As switch 110 is turned on, a current $I_L$ passes a current filter, which includes an inductor 120 and a capacitor 140. The inductor 120 is also coupled to an inductor current sampling resistor 130 and an output resistor 150. The feedback circuit to switch 110 includes a voltage divider 160, an amplifier 170, and a comparator 180. Voltage divider 160 divides the output voltage Vout, resulting in a scaled voltage VFB, which is sent to amplifier 170 as one input. Another input of amplifier 170 is a reference voltage VREF. Comparator 180 then takes the voltage output VC of amplifier 170 and the voltage V_sense resulting from current $I_L$ passing through the inductor current sampling resistor 130 and outputs a feedback signal, which controls switch 110. Diode 190 isolates the switch output from the ground and continues the current when switch 110 is off.

Switching regulators using a current-control mode typically employ three different control modes. These modes are peak current mode control, valley current mode control and average current mode control. In peak current mode control, a peak inductor current is controlled along with the output voltage. Similarly, in valley current mode control, the minimum current is controlled along with the output voltage. And in average current mode control, the average current is controlled along with the voltage. However, peak current mode control is typically preferred, because of its easier design and its intrinsic current limitation in each cycle.

A serious noise problem arises in current-mode control when the duty ratio (or duty cycle) D is larger than 50%. This noise is known as the sub-harmonic oscillation, which greatly compromises the stability of the control loop.

FIG. 2A describes the inductor's current waveform as a function of time in a basic switching regulator, such as shown in FIG. 1. The current-mode control senses an inductor current, such as $I_L$ shown in FIG. 1, and produces a voltage V_sense through a resistor R, such as resistor 130. This voltage is then compared with a control voltage VC, which is the comparison result of the scaled-down output voltage VFB and a reference voltage VREF. In FIG. 2A, the solid line describes the waveform in a stable state and the dashed line describes the waveform in a perturbed state. D refers to the duty ratio of the current signal, D' is (1-D), T is the system clock period, Vc is the control voltage, $S_r$ is the rising ramp ratio, and $S_f$ is the falling ramp ratio of the inductor voltage. In a stable state, the inductor current at the beginning of a period t1 is exactly the same as at the beginning of the next period t2. However, in a perturbed state, it is assumed that the inductor current is perturbed by a change in the current through the inductor at time t1 $\Delta I_L(t1)$ and the change in the current through the inductor at a time t2 becomes $\Delta I_L(t2)$. It is also assumed that the perturbed waveform has the same rising and falling slopes as the stable waveform. The rising perturbed waveform crosses Vc at an earlier time and the time differs by $\Delta t$. Both rising and falling slopes in the stable state are parallel to corresponding slopes in the perturbed states. Therefore, we have the following equations:

$$R \times \Delta I_L(t1) = S_r \times \Delta t \quad R \times \Delta I_L(t2) = S_f \times \Delta t \tag{1}$$

Based on equation (1), equation (2) is derived by using $S_r = VC/DT$, and $S_f = VC/D'T$.

$$\Delta I_L(t2) = \Delta I_L(t1) \times \frac{D}{1-D} \tag{2}$$

Based on recursion, the inductor current perturbation at time tN (N is a positive integer) can be written as $$\Delta I_L(tN) = \Delta I_L(t1) \times \left(\frac{D}{1-D}\right)^{N-1} \tag{3}$$

If the duty ratio D is less than 50% and $$\frac{D}{1-D}$$

is less than 1, the inductor current perturbation $\Delta I_L(tN)$ will approach zero after a large number N cycles, forming a stable state.

Otherwise, when the duty ratio D is larger than 50% and $$\frac{D}{1-D}$$

is more than 1, the inductor current perturbation will become larger and larger with growing cycles, resulting in large inductor current perturbation $\Delta I_L(tN)$ and an unstable condition. Therefore, a duty ratio D of less than 50% is critical in keeping the control loop stable.

In FIG. 2B, an artificial compensation slope Se is introduced to the inductor current ramp, in the inductor voltage waveform as $R \Delta I_L$. Similarly, we have $$R \times \Delta I_L(t1) = (Sr + Se) \times \Delta t \tag{4}$$
$$R \times \Delta I_L(t2) = (S_f - Se) \times \Delta t$$

and $$\Delta I_L(tN) = \Delta I_L(t1) \times \left(\frac{S_f - Se}{Sr + Se}\right)^{N-1} \tag{5}$$

Equation (5) indicates that, the control loop will be stable when a factor $$\frac{S_f - Se}{Sr + Se}$$

is less than 1 and the factor's limit approaches zero when the number of cycles N becomes large, or the artificial compensation slope Se is larger than 50% of the falling slope $S_f$ of the inductor current slope.

For a basic switching regulator such as a buck regulator, the inductor waveform falling slope $S_f$ is determined from the output voltage Vout, the resistor R, temperature, and the inductance L. When the output voltage Vout is well regulated in a constant temperature state and the falling ramp ratio of the inductor voltage $S_f$ is also stable, once the inductance L is set, the compensation slope Se can be determined as follows:

$$Se \geq 0.5 \frac{Vout}{L} \quad (6)$$

In other types of switching regulators, such as in a boost or in a buck-boost switching regulator, the inductor current falling ramp slope is affected by several factors, including the output voltage, the input power, the inductor and others. In a stable switching regulator system, these factors can be accurately determined. Appropriate circuits and methods can be employed to integrate these factors such that the compensation slope Se is equal or greater than half of the inductor current falling slope, i.e.

$$Se \geq 0.5 S_f(x1, x2, \ldots xi) \quad (7)$$

in which xi (i is a positive integer) stands for one of these factors affecting the inductor current falling slope.

FIG. 3 shows a block diagram 300 of a switching regulator in accordance with some embodiments. The switching regulator transfers the input voltage VDD 305 into a stable output voltage Vout 395. Block Pulse-Width-Modulator (PWM) control 330 activates and deactivates both power MOSFETs, 360 and 370. When MOSFET 360 is activated, MOSFET 370 will be deactivated and current will switch from VDD 305 to a switching voltage VSW 381 at the node 365. The current in inductor 380 increases to be equal to the current through MOSFET 360. When MOSFET 360 is deactivated, MOSFET 370 will be activated to continue switching current from ground GND to switching voltage VSW 381 at the node 365. The current in inductor 380 then decreases. In some embodiments, the power MOSFET 370 can be replaced by a diode which can also flow current from ground to switching voltage VSW 381. However, more energy will be consumed by this diode, leading to lower power efficiency, so a diode is not a preferred device here. The inductor 380 and capacitor 390 are connected at an output node 385 to form a low-pass filter, which can reduce ripples in output voltage Vout 395.

The output voltage Vout 395 is stable, because of a voltage-control loop shown in FIG. 3. This loop includes Vout 395, a voltage divider formed by resistors Rfb1 301 and Rfb2 302, a slope compensation generation circuit 310, an inductor current sensing circuit 320, a PWM control circuit 330, and two transistors, 360 and 370. Consistent with some embodiments, transistors 360 and 370 may comprise power MOSFETs. The output voltage Vout 395 is divided by resistors Rfb1 301 and Rfb2 302, resulting in a scaled voltage VFB 303, which is sent to the slope compensation generation circuit 310 and a PWM control circuit 330. A slope compensation current, I_slope 331, output of the slope compensation generation circuit 310, is generated and forwarded to the PWM control circuit 330.

As further shown in FIG. 3, the voltage-control loop also includes a current-control loop. The current-control loop includes an inductor current sense circuit 320, the PWM control circuit 330, and the power MOSFET 360. The inductor current sense circuit 320 senses the current in the output inductor 380, and outputs a sense current I_sense 332 to the PWM control circuit 330. In PWM control circuit 330, signals I_slope 331, and I_sense 332 are transformed into voltage and summed together. The output (340) $\overline{Q}$ of PWM Control 330 is used as inputs for both power MOSFETs 360 and 370. Another output 350 (Q), the inverse of 340 ($\overline{Q}$), is used as a control input for the inductor current sense circuit 320. The inductor current sense circuit 320 is also coupled to the input voltage VDD 305 for its voltage supply. In addition, the inductor current sense circuit 320 is also coupled to the power MOSFET 360 at a node 364, as shown in FIG. 3. As a result, the current in inductor 380, i.e. the current through MOSFET 360 (assuming MOSFET 370 is off), is controlled by the current-control loop, and the output voltage Vout 395 is also controlled by the voltage-control loop.

Consistent with some embodiments, a current feedback loop disclosed in FIG. 3 is implemented with the output inductor current mirrored and scaled by an inductor current sense circuit. The fundamental function of the current feedback loop is to copy the current through the power MOSFET 360 when it is activated.

Figure 4:
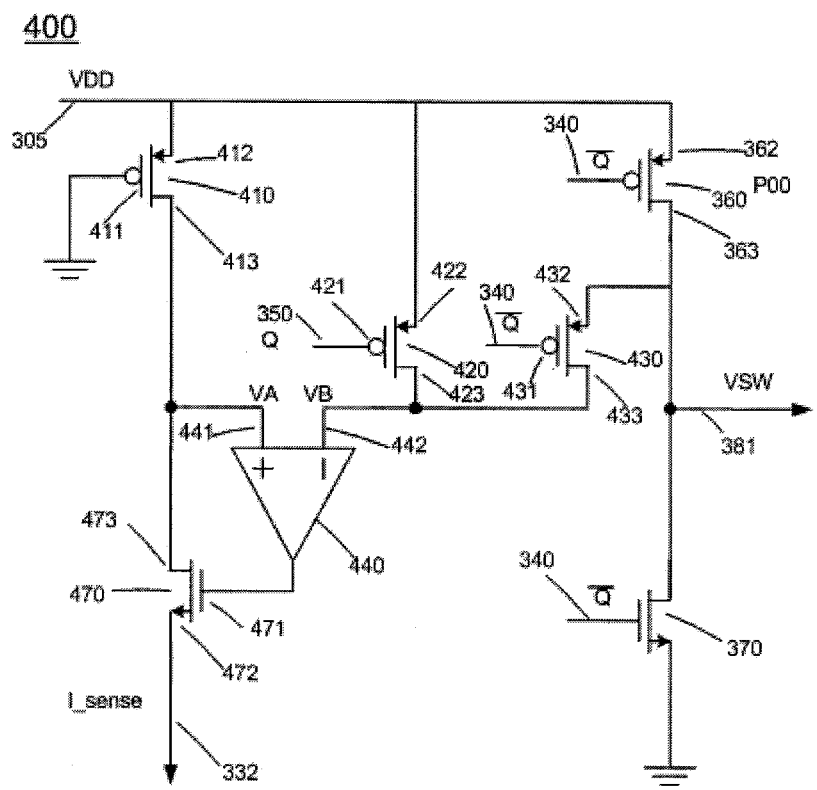
FIG. 4 illustrates an exemplary inductor current sensor.

In FIG. 4 diagram 400 describes the inductor current sense circuit 320 set forth in FIG. 3. As shown in FIG. 4, the inductor current sense circuit includes MOSFETS 410, 420, 430, and 470, and amplifier 440, which may be coupled to power MOSFETS 360 and 370 shown in FIG. 3. As discussed above, power MOSFETs 360 and 370 are controlled by signal 340 ($\overline{Q}$) which is an output from the PWM control circuit 330 in FIG. 3. Consistent with some embodiments, MOSFET 410 has a scaled aspect ratio same as that of MOSFET 360. The source 412 of MOSFET 410 is tied to a positive power rail VDD 305 and its gate 411 is fixed to ground to replicate a turn-on condition of MOSFET 360. Having the same aspect ratios, switching transistors 420 and 430 are respectively controlled by 350 (Q) and 340 ($\overline{Q}$) which are outputs of the PWM control circuit 330. The source 422 of transistor 420 is tied to positive power VDD 305 and the source 432 of transistor 430 is tied to voltage VSW 381. Both drains 423 and 433 of transistor 420 and transistor 430 are tied together to a node of voltage VB 442, which provides a negative input to amplifier 440. The positive input, VA 441, of amplifier 440 is tied to the drain 413 of MOSFET 410. The output of amplifier 440 is connected to the gate 471 of MOSFET 470, whose drain 473 is tied to the node at voltage VA 441. The source 472 of MOSFET 470 outputs a current signal, I_sense 332. Amplifier 440 builds a feedback loop through MOSFET 470, which forces node VA 441 and VB 442 equal to each other with opposite polarities at all times.

When MOSFET 360 is activated, the current through MOSFET 360 is transmitted into the inductor 380 (shown in FIG. 3) and the current is rising with a certain slope. At the same time, MOSFET 430 is activated and MOSFET 420 is deactivated, making voltage VB 442 at one input to amplifier 440 equal to the voltage VSW 381. Because of the feedback loop provided by amplifier 440 and MOSFET 470, voltage VA 441 at the positive input of amplifier 440 is also equal to the voltage VB 442 at the negative input of amplifier 440, therefore also equal to the voltage VSW 381 As a result, the voltage drop from source 412 to drain 413 of MOSFET 410 follows the voltage drop from source 362 to drain 363 of MOSFET 360, enabling MOSFET 410 to mirror a certain proportion of current in MOSFET 360, according to the aspect ratio of MOSFET 410 and MOSFET 420. Assume that the scale of aspect ratio of MOSFET 410 to MOSFET 420 is 1 and the scale of aspect ratio of MOSFET 360 to MOSFET 420 is M, an integer larger than 1, the current through MOSFET 410 is 1/M of the current through MOSFET 360. If MOSFET 360 and MOSFET 410 are on for the same amount of time, the sensed current ramp slope of MOSFET 410, i.e. I_sense 332 from the inductor current sense circuit 320 in FIG. 3, is also 1/M of the current ramp slope of MOSFET 360. The MOSFETs shown in FIG. 3 and FIG. 4 may be n-type or p-type MOSFETs consistent with some embodiments.

After current through MOSFET 360 reaches its peak value, MOSFET 360 is deactivated, MOSFET 430 is deactivated, but MOSFET 420 is activated, cutting off the connection between VB 442 and VSW 381, pulling up voltage VB 442 to the positive power supply voltage VDD 305. Because of the feedback loop provided by amplifier 440 and MOSFET 470, VA 441 is also pulled up to voltage VDD 305 from the feedback loop effect. Therefore, MOSFET 410 is shut off and the gate 471 of MOSFET 470 is pulled to ground. Then MOSFET 470 is shut off and I_sense 332 decreases to zero. At this time, the current of the inductor 380 begins to decrease until MOSFET 360 is re-activated in the next cycle.

Figure 5:
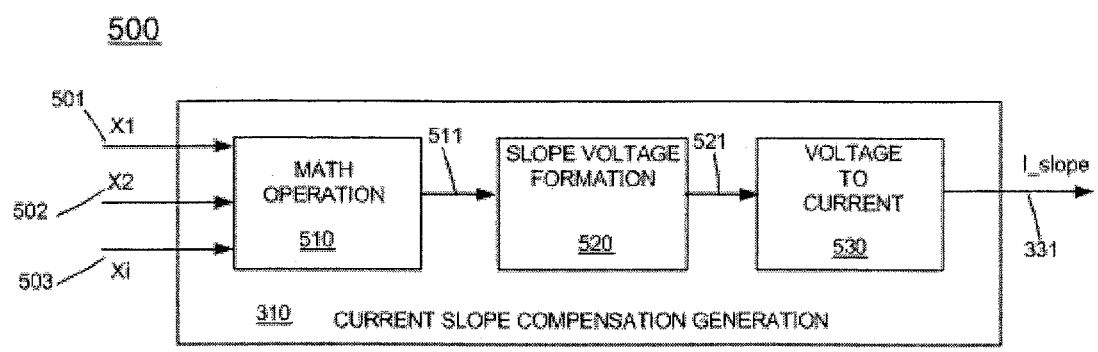
FIG. 5 illustrates a block diagram of a current-slope compensation generation circuit.

Consistent with some embodiments, the current slope should be compensated to eliminate sub-harmonic oscillation for a current-mode-control switching regulator, such as shown in FIG. 3 and FIG. 4. FIG. 5 describes a block diagram 500 of a slope compensation generation circuit 310 consistent with some embodiments. The slope compensation generation circuit 310 comprises three parts: a math operation block 510, a slope voltage formation block 520 and a voltage-to-current generation block 530. Consistent with some embodiments, the "blocks" may be modules, circuits, integrated circuits (ICs), arrangements of circuits, or chips that are programmed to perform the particular functions. For a specific form of switching regulator, the inductor current falling slope is a function of several factors x1, x2, ... xi, as shown in equation (7). In the slope compensation generation circuit 310, a number of input factors such as input voltage, output voltage, inductor and other electrical variables, represented by x1 501, x2 502, and xi 503. are processed through the math operation block 510, where a number of mathematic computations are performed by appropriate circuits to solve for the parameters in equation (7). The output signal 511, which can be in form of either current or voltage, is then changed into a slope voltage 521 through the slope voltage formation block 520. Further, this slope voltage 521 is transformed into a slope compensation current I_slope 331 by a voltage-to-current block 530, where I_slope 331 is well regulated. The current slope compensation generation block 310 typically comprises several types of circuits, including a circuit that changes a voltage into a constant current, a circuit that produces certain slope voltage, and a circuit that converts this slope voltage into certain slope current.

Figure 6:
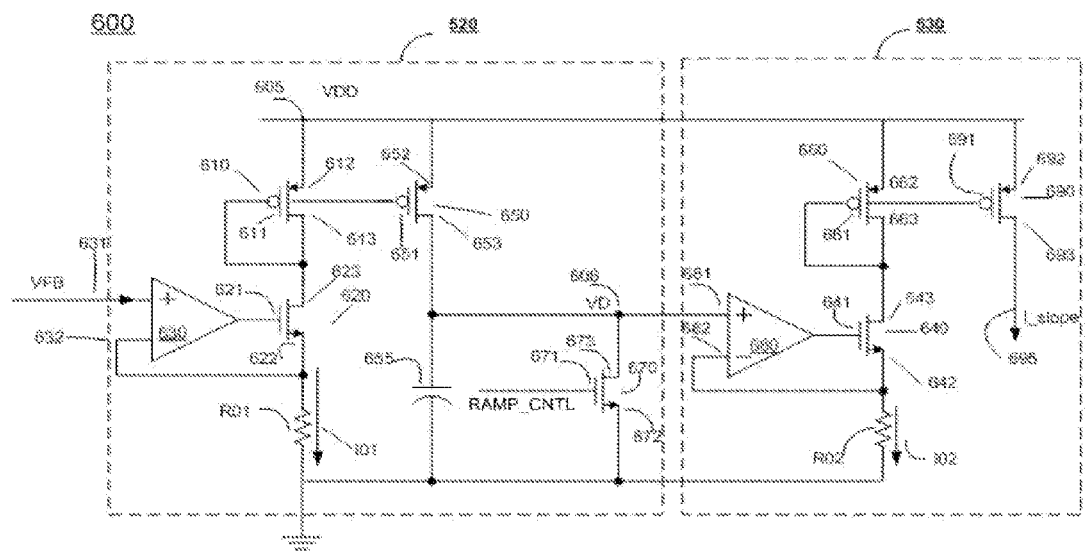
FIG. 6 illustrates an exemplary circuit for generating a current slope compensation.

FIG. 6 illustrates a diagram 600 of a slope compensation generation circuit 310 consistent with some embodiments. In FIG. 6, the three parts of the slope compensation generation circuit 310 are illustrated in detail. As an example, a buck switching regulator is used in the current slope compensation generation circuitry. According to equation (6), the inductor current falling slope is only regulated by the output Vout in a buck switching regulator. Hence, the first part, the math operation block 510, is simplified by an input voltage VFB 631, which is a scaled-down voltage of Vout. Slope voltage formation block 520 includes an amplifier 630, NMOSFETs 620 and 670, PMOSFETs 610 and MOSFET 650, a resistor R01, and a capacitor 655. In the slope voltage formation block 520, a Vout-related current is produced first and then a slope voltage is generated. The positive input terminal of Amplifier 630 is coupled to the scaled-down feedback voltage VFB 631. The negative input of amplifier 630 is coupled to both the source 622 of MOSFET 620 and one terminal of resistor R01. The output of amplifier 630 is connected to the gate 621 of MOSFET 620. Thus, a feedback loop is formed by amplifier 630 and MOSFET 620, resulting in the source voltage 622 of MOSFET 620 equal to VFB 631. Therefore current I01 through R01 is related to Vout by the following equation $$I01 = \frac{VFB}{R01} = \frac{Vout \times Rfb2}{R01 \times (Rfb1 + Rfb2)} \quad (8)$$

Moreover, a drain 613 of MOSFET 610 is coupled to the drain 623 of MOSFET 620, transmitting the same current as in MOSFET 620. Moreover, gate 651 of MOSFET 650 is coupled to the gate 611 of MOSFET 610 and mirrors the current of MOSFET 610, i.e. I01 in resistor R01. Depending on whether the aspect ratios of MOSFET 610 and MOSFET 650 are the same or different, MOSFET 650's current may be the same as, or a scaled-down, or a multiple of, the current of MOSFET 610. As an example, assuming, MOSFET 610 and MOSFET 650 have the same aspect ratio, then MOSFET 610 and MOSFET 650 pass the same amount of current. The drain 653 of MOSFET 650 is coupled to one terminal of capacitor 655, the node of voltage VD 608, the drain 673 of a MOSFET 670 and the positive input 681 of an amplifier 680. MOSFET 670 works as a switch and is controlled by a control signal RAMP_CTRL 671. Signal RAMP_CTRL 671 comes from the system clock (shown in FIG. 7) and turns MOSFET 670 on for a short time at the beginning of the system clock period T. As a result, the voltage of VD 608 is pulled to ground during this short time span. Then MOSFET 670 is turned off and the current of MOSFET 650 begins charging capacitor 655 during the rest of the clock period T. Because MOSFET 670's turn-on time is short and can be ignored compared to the system clock period T, the voltage VD 608 can be written as a function of time t:

$$VD(t) = \frac{I01}{C_{ramp}} \times t \quad (9)$$

in which t is a time between 0 and T, and $C_{ramp}$ is the capacitor value of 655 Since I01 is constant under stable conditions, VD (t) is a ramp voltage which increases from ground after a short time from the beginning of each system clock period and falls back to ground at the beginning of the next system clock period. Consistent with some embodiments, MOSFETs 610, 620, 650, and 670 may be an N-type MOSFET or a p-type MOSFET.

Voltage-to-current generator block 530 of the slope compensation generation produces a well-controlled slope current, and includes amplifier 680, MOSFET 640, MOSFET 660, and MOSFET 690. Amplifier 680 and MOSFET 640 construct a feedback loop to match node voltage VD 608 to the source voltage 641 of MOSFET 640. One terminal of resistor R02, where I02 flows, is coupled to the source 642 of MOSFET 640. As a result, the current I02 through resistor R02 is $$I02(t) = \frac{VD(t)}{R02} \quad (10)$$

The drain 663 of MOSFET 660 is coupled to the drain 643 of MOSFET 640, and an identical current flows in MOSFET 660 and MOSFET 640. Gates 661, 691 of MOSFET 660 and MOSFET 690 are coupled together and MOSFET 690 mirrors the current of MOSFET 660, i.e. I02. The aspect ratios of MOSFET 660 and MOSFET 690 may be same or different, and the current of MOSFET 690 will be the same as, or a scaled-down, or a multiple of, MOSFET 660's current. As an example, assume MOSFET 660 and MOSFET 690 have the same aspect ratio. Then the slope compensation current I_slope 695 through MOSFET 690, can be written as $$I\_slope(t) = \frac{Vout \times Rfb2 \times t}{C_{ramp} \times R01 \times R02 \times (Rfb1 + Rfb2)} \quad (11)$$

and its slope is $$\frac{dI\_slope(t)}{dt} = \frac{Vout \times Rfb2}{C_{ramp} \times R01 \times R02 \times (Rfb1 + Rfb2)} \quad (12)$$

FIG. 7A illustrates the block diagram 700 of generating a control signal RAMP_CTRL in accordance with some embodiments. FIG. 7B shows the waveform of the system clock signal CLK. FIG. 7C shows the waveform of output RAMP_CTRL signal. In FIG. 7A, system clock CLK is the input of a first inverter 710 and a NAND device 730. A buffer 720 follows first inverter 710 and delays the inverted clock signal CLK. The original clock signal CLK and the delayed inverted clock signal 725 are input into the NAND gate 730, and the output of NAND gate 730 is input into a second inverter 740. Second inverter 740 outputs a signal which is the control signal RAMP_CTRL, which is only high for a short time at the beginning of a clock period, but low for the rest of the period, as shown in FIG. 7C.

Figure 8:
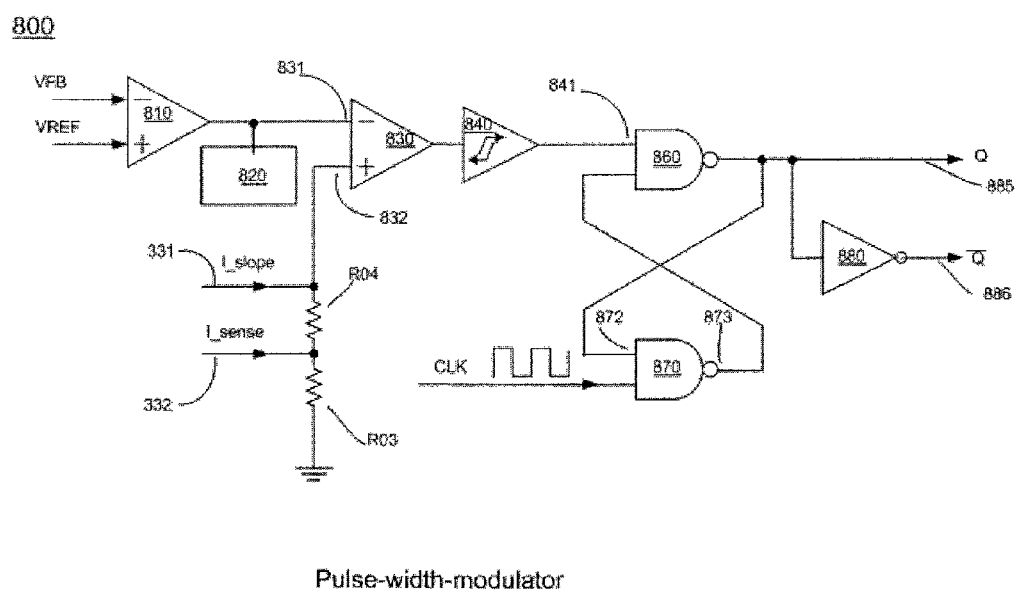
FIG. 8 illustrates an example of a pulse width modulation (PWM) control circuit.

FIG. 8 describes a diagram 800 of a PWM control circuit 330 consistent with some embodiments. The feedback voltage VFB 801 from an external voltage feedback loop, and the feedback current I_sense 332 along with its slope compensation current I_slope 331 from an internal current feedback loop, integrate in a PWM control circuit in FIG. 8. The feedback voltage VFB 801 is coupled to the negative input of an amplifier 810. A voltage reference voltage 802, for example, a band-gap voltage around 1.2V, is coupled to the positive input of amplifier 810. Amplifier 810's output is passed through a low-pass filter 820 which is designed to have a flexible frequency response, adaptable to meet the requirements of the switching regulator system. Node 831, which is coupled to the output of amplifier 810 and to low-pass filter 820, is coupled to a negative input of a comparator 830. The positive input 832 of comparator 830 is coupled to resistors R04 and R03 in series. The first resistor R03 is grounded at one end and connects to the feedback current I_sense 332 at another end. The first resistor R03 connects to one terminal of the second resistor R04 and, using Ohm's Law, has a voltage of $$V\_sense = I\_sense(t) \times R03 \quad (13)$$

The slope compensation current I_slope 331 is injected to the other terminal of R04, also node 832, and produces a voltage through resistors R03 and R04 as $$V\_slope = I\_slope(t) \times (R03 + R04) \quad (14)$$

Then, the voltage at node 832 can be written as $$VE = V\_sense(t) + V\_slope(t) \quad (15)$$

Since comparator 830 compares two voltage inputs nodes 831 and 832, the actual voltage compensation slope is $$\text{slope\_comp} = \alpha \times V_{out}, \quad (16)$$
$$\alpha = \frac{Rfb2 \times (R03 + R04)}{C_{ramp} \times R01 \times R02 \times (Rfb1 + Rfb2)}$$

And, to comparator 830, the actual inductor current rise slope, in form of voltage, is $$\text{rise\_ind} = \frac{R03}{M} \times \frac{dI\_sense(t)}{dt} \quad (17)$$

Moreover, to comparator 830, the fall slope of inductor current, in form of voltage, can be written as $$\text{fall\_ind} = \beta \times V_{out}, \quad (18)$$
$$\beta = \frac{R03}{Lo \times M}$$

Equation (16) shows the current compensation slope expressed in voltage form, which is determined by resistors Rfb1 301, Rfb2 302, R01–R04, capacitor 655, and output voltage 395. Equation (18) shows that, in voltage form, the fall slope of inductor current is determined by resistor R03, inductor 380, current mirror ratio M, and output voltage 395.

Combining equations (16), (18), and equation (7), which is Se≥0.5S$_f$(x1, x2, . . . xi.), and replacing Se with slope_comp and S$_f$ with fall_ind, the following equations are realized:

$$\text{slope\_comp} \geq 0.5 \text{ fall\_ind} \quad (19)$$

$$\alpha \geq 0.5 \beta \quad (20)$$

Therefore, according to Equation (19), in order to suppress the sub-harmonic oscillation, the current compensation slope should be at least half of the fall inductor current slope. In other words, parameter α in equation (16) should be no less than half of parameter β as shown in equation (20). By fixing parameters α and β in a parametric calculation, appropriate design goals can be achieved for various applications. For more complex applications, the output voltage Vout in FIG. 3 may be adjusted to desired values. Consequently, adjusting output voltage Vout will change the current compensation slope 331 and the fall slope of the inductor current 332 accordingly. As a result, the current compensation slope, in form of voltage, will be at least as large as half of the fall slope of inductor current at all times.

Returning to FIG. 8, a comparator 830 is coupled to a hysteresis buffer 840 to form a comparison block. The comparator 830 compares the first input 831 with the second input 832 and the result is saved in the hysteresis buffer 840. The hysteresis buffer 840 erases all unnecessary noise pulses in the comparison signal. The output of the hysteresis buffer 840 becomes a control signal 841 which is then input to the first logic NOR cell 860. For the second logic NOR cell 870 there are two input signals. The first input is the system clock signal CLK, described in FIG. 7B. Both NOR cells 860 and 870 have feedback connections to each other, forming a set-reset NOR latch (SR NOR latch) block. The first NOR cell 860 outputs a control signal 885 (Q) for the inductor current sense and an inverter 880 inverses this signal 885 (Q) to an output signal 886 ($\overline{Q}$), which becomes a control signal for power MOSFETs 360 and 370, as shown in FIG. 3. The scaled down feedback input voltage VFB, is compared to a reference voltage VREF by an error amplifier 810.

Figure 9:
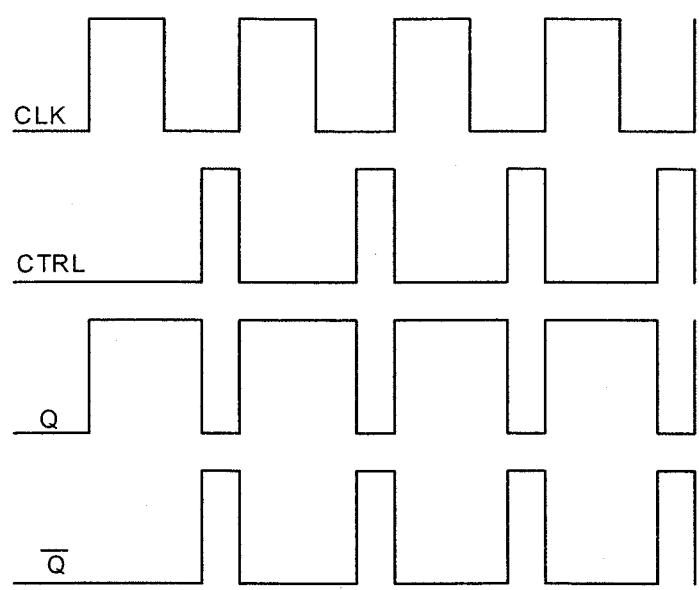
FIG. 9 illustrates input and output waveforms of an exemplary set-reset (SR) latch in a PWM control circuit.

FIG. 9 illustrates the input and output waveforms from the SR NOR latch circuit in FIG. 8. The input signals are the control signal 841 and system clock signal CLK. The output waveforms are the inductor current sense signal 885 (Q) sent to power MOSFET 360 or MOSFET 370 in FIG. 3 and its inverted signal 886 ($\overline{Q}$). The rising edge of CLK signal triggers signal 885 (Q) to transition to a logic high, and the rising edge of control signal 841 triggers signal 885 (Q) to transition to a logic low. Therefore, the rising edge of CLK initiates the on-time of power MOSFET 360 when MOSFET 360 conducts current from power VDD 305 to inductor 380. The rising edge of control signal 841 starts the off-time of power MOSFET 360 and turns on power MOSFET 370 to continue current to the inductor 380.

Figure 10:
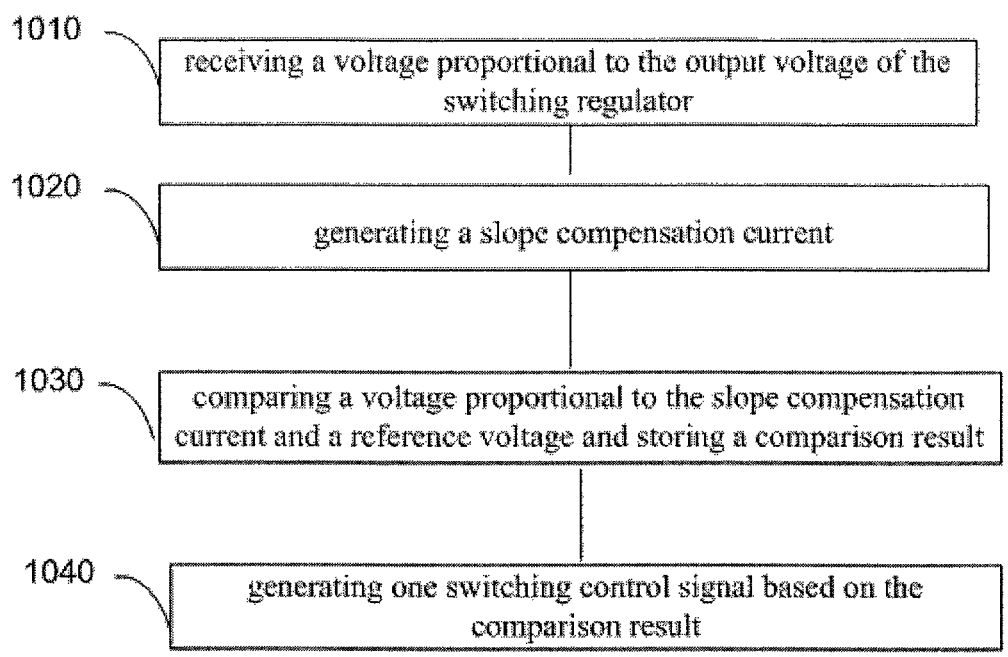
FIG. 10 is a flowchart of a method for controlling switching regulator according to some embodiments.

FIG. 10 is a flow chart of a method for controlling switching regulator according to some embodiments. The steps shown in FIG. 10 will explain in conjunction with the system shown in FIG. 3 as an example. In step 1010, a voltage Vfb is received by slope compensation circuit 310, the voltage is proportional to an output voltage Vout of the switching regulator. In step 1020, a slope compensation current I_slope is generated by slope compensation circuit 310 and transmitted from the slope compensation circuit 310 to a pulse width modulation control circuit 330. In step 1030, a comparator 830 (shown in FIG. 8) in pulse width modulation control circuit 330 compares a voltage which is proportional to the slope compensation current I_slope and a reference voltage, and then stores the comparison result in the PWM, for example in hysteresis buffer 840. In step 1040, a control signal $\overline{Q}$ is generated by the pulse width modulation control circuit 330 based on the comparison result. Control signal $\overline{Q}$ is then transmitted to MOSFETs 360 and 370 based on the comparison result to activate either MOSFET 360 or MOSFET 370 to control the switching on and off of these MOSFETs, and thus controlling the switching regulator.

The above detailed description of a switching regulator having a self-adaptive current slope compensation is provided to illustrate specific embodiments and is not intended to be limiting. Numerous variations and modifications within the scope of the present disclosure and the embodiments described therein are possible.

What is claimed is:

1. A current-mode-control circuit for a switching regulator, comprising:
a first transistor coupled to a power supply voltage and to a first node; a second transistor coupled to the first node; an inductor coupled between the first node and an output of the current-mode control circuit; a slope compensation generation circuit coupled to the output of the current-mode control circuit through a feedback loop, and generating a slope compensation current proportional to the output of the current-mode-control circuit, related the slope compensation generation circuit comprising: a math operation circuit receiving the output of the current control circuit; a slope voltage formation circuit, different from the math operation circuit, coupled to the math operation circuit; and a voltage-to-current conversion circuit coupled to the slope voltage formation circuit; an inductor current sense circuit coupled to the first node, and configured to calculate a current through the inductor and output an inductor sense current; and a pulse-width modulation (PWM) control circuit having an output and an inverted output, an input of the inductor current sense circuit being coupled to the output of the PWM control circuit and a gate of the first transistor and a gate of the second transistor being coupled to the inverted output of the PWM control circuit, the PWM control circuit receiving the output of the current-mode-control circuit, the slope compensation generation current, and the inductor sense current as inputs; and wherein the math operation circuit is configured to solve the following equation: Se >0.5*Sf(x1, x2, . . ., xi), wherein Se is an output to the slope voltage formation circuit, Sf(x1, x2, . . ., xi) is an inductor current falling slope function for determining a falling slope Sf based on the output of the current control circuit, the output of the current control circuit represented by x 1, x2, . . ., xi.

2. The circuit of claim 1, further comprising: a capacitor coupled to the inductor for forming a low-pass filter.

3. The circuit of claim 1, wherein the feedback loop comprises at least one resistor.

4. The circuit of claim 1, wherein the slope voltage formation circuit comprises:
an amplifier receiving an input voltage and a feedback voltage;
a third transistor coupled to an output of the amplifier;
a fourth transistor coupled between the third transistor and the power supply voltage;
a fifth transistor coupled to the power supply voltage and the fourth transistor;

a first resistor coupled between the third transistor and ground; and
a sixth transistor coupled to the fifth transistor.

5. The circuit of claim 4, wherein a gate of the third transistor is coupled to the output of the amplifier, and a source of the third transistor is coupled to an input of the amplifier for providing the feedback voltage.

6. The circuit of claim 4, wherein the input voltage is proportional to the output of the current-mode-control circuit.

7. The circuit of claim 4, wherein the voltage-to-current conversion circuit comprises:
a second amplifier having an input coupled to a drain of the fifth transistor and a drain of the sixth transistor;
a seventh transistor coupled to an output of the second amplifier;
an eighth transistor coupled between the power supply voltage and the seventh transistor;
a ninth transistor coupled to the power supply voltage and the eighth transistor; and
a second resistor coupled between the seventh transistor and ground.

8. The circuit of claim 7, wherein the slope compensation current is output from the ninth transistor.

9. The circuit of claim 1, wherein the inductor current sense circuit comprises at least one transistor having a similar aspect ratio to an aspect ratio of the first transistor such that the inductor current sense circuit calculates a current through the inductor by minoring the current output from the first transistor.

10. The circuit of claim 1, wherein the pulse width modulation control circuit comprises:
a third amplifier receiving a reference voltage and a voltage proportional to the output of the current control circuit as inputs;
a low-pass filter coupled to an output of the third amplifier;
a fourth amplifier coupled to the low-pass filter, and receiving the slope compensation current and the inductor sense current as inputs;
a hysteresis buffer coupled to the fourth amplifier; and
a latch coupled to the hysteresis buffer.

11. The circuit of claim 10, wherein the fourth amplifier compares voltages proportional to the slope compensation current and the inductor sense current with the output of the third amplifier and stores a result in the hysteresis buffer.

12. A method for controlling a switching regulator, comprising:
receiving, by a slope compensation generation circuit that includes a capacitor, a voltage proportional to an output voltage at an output of the switching regulator; generating, by the slope compensation generation circuit, a slope compensation current: the slope compensation generation circuit comprising: a math operation circuit receiving the output of the current control circuit; a slope voltage formation circuit, different from the math operation circuit, coupled to the math operation circuit; and a voltage-to-current conversion circuit coupled to the slope voltage formation circuit; transmitting the slope compensation current from the slope compensation generation circuit to a pulse width modulation control circuit; comparing, by a comparator in the pulse width modulation control circuit, a voltage proportional to the slope compensation current and a reference voltage and storing a comparison result; generating, by the pulse width modulation control circuit, a switching control signal and an inverted switching control signal based on the comparison result; transmitting the switching control signal to an induction current sense circuit; and transmitting the inverted switching control signal to a first transistor and a second transistor, the first and second transistors coupled to the output by an inductor; and wherein the math operation circuit is configured to solve the following equation: $Se > 0.5*Sf(x1, x2, \ldots, xi)$, wherein Se is an output to the slope voltage formation circuit, $Sf(x1, x2, \ldots, xi)$ is an inductor current falling slope function for determining a falling slope Sf based on the output of the current control circuit, the output of the current control circuit represented by $x1, x2, \ldots, xi$.

13. The method of claim 12, wherein the slope compensation current is proportional to the voltage proportional to the output voltage of the switching regulator.

14. The method of claim 12, further comprising:
receiving the switching control signal and a power supply voltage at the induction current sense circuit;
generating, by the induction current sense circuit, an induction sense current from the at least one switching control signal and the power supply voltage.

15. The method of claim 14, wherein comparing a voltage proportional to the slope compensation current and to a reference voltage further comprises:
receiving, by the pulse width modulation control circuit, the induction sense current; and
comparing, by the comparator in the pulse width modulation control circuit, a voltage proportional to the slope compensation current and the induction sense current and a reference voltage and storing the comparison result.

16. The method of claim 15, wherein the induction sense current is proportional to a current flowing through an inductor of the switching regulator.

17. The method of claim 16, wherein the current flows through the inductor based on the switching signal.

* * * * *